R. STRATTON & G. OLMSTED.
Horse-Yoke.

No. 161,988.

Patented April 13, 1875.

UNITED STATES PATENT OFFICE.

RUFUS STRATTON AND GEORGE OLMSTED, OF HAZARDVILLE, CONNECTICUT.

IMPROVEMENT IN HORSE-YOKES.

Specification forming part of Letters Patent No. 161,988, dated April 13, 1875; application filed December 19, 1874.

*To all whom it may concern:*

Be it known that we, RUFUS STRATTON and GEORGE OLMSTED, of Hazardville, Hartford county, Connecticut, have invented a new and useful Improvement in Horse-Yokes, of which the following is a specification:

The object of this invention is to provide apparatus by means of which horses may be attached to plows, harrows, and similar agricultural implements or vehicles without the use of traces and whiffletrees or the ordinary harness, thereby relieving the horse of much discomfort, and getting rid of the whiffletrees, which are a source of much obstruction in cultivating the soil among trees and in other situations; and the invention consists in a yoke attached to the hames and made adjustable, the construction being as hereinafter described.

Figure 1:
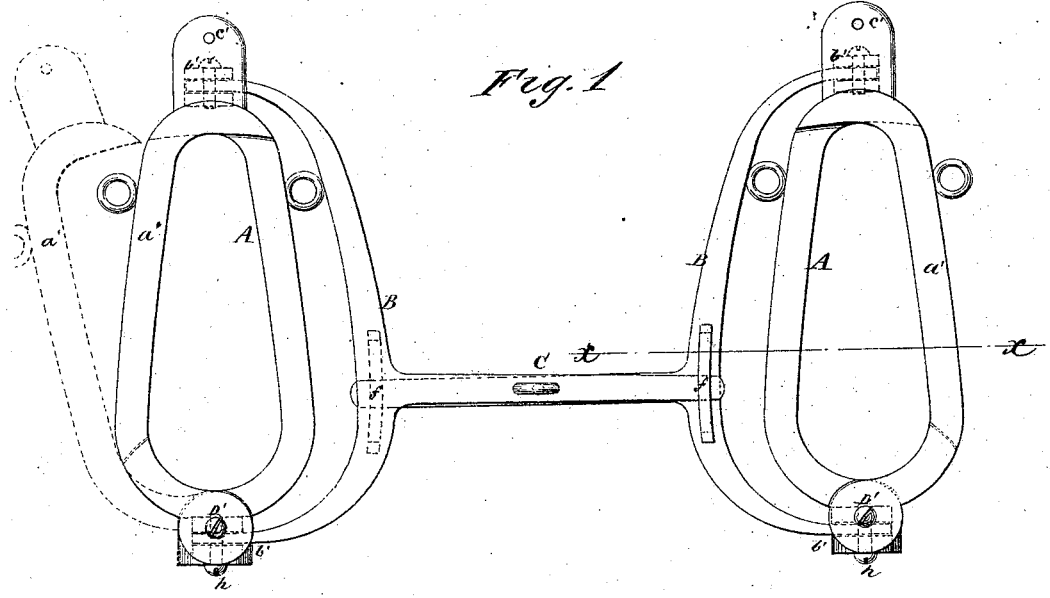
Figure 2:
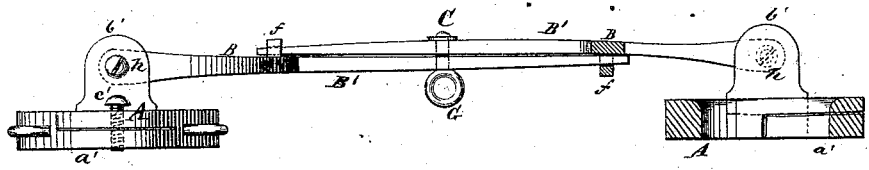

Figure 1 is a front view, showing the yoke and the hames, and Fig. 2 is a view looking down from the line $x\ x$, Fig. 1.

Similar letters of reference indicate corresponding parts.

A are the hames, which are placed on the horse-collar in the ordinary manner. They are made each in two parts, which are hinged together at the bottom by pivots D' and open at the top, as seen in Fig. 1 in dotted lines. They are fastened at the upper end by a screw, as seen at C', or in any other suitable manner. b' are projecting ears on the hames, which are slotted horizontally to receive the outer ends of the yoke, where they are jointed by pins or screws d and h. The yoke is made in two parts and is marked B B. B' B' are horizontal bars, which project from the side bows B B and lap past each other and work on the draft-pin C, which pin passes through both bars. The ends of these bars play up and down to accommodate the position of the horses. ff are long staples attached to the parts B B, which limit the motion of the ends of the bars. a' represents the hinged parts of the hames. G is the draft-ring, to which the draft-chain is attached.

It will be seen that the yoke is self-adjusting on the draft-pin C, and will accommodate itself to the movements of the horses.

The hames turn freely on the pins h and d in the projection b'.

The horses, by this arrangement, are relieved of the harness, but breeching and cruppers may be attached when considered necessary; but traces and whiffletrees are by this arrangement entirely dispensed with.

Having thus described our invention, we claim as new and desire to secure by Letters Patent—

The combination, with the hames and collars, of the yoke B B with the adjusting-bars B' B', substantially as and for the purposes herein described.

RUFUS STRATTON.
GEORGE OLMSTED.

Witnesses:
A. D. BRIDGE,
DANIEL H. HEMENWAY.